United States Patent [19]
Forster

[11] Patent Number: 4,467,604
[45] Date of Patent: Aug. 28, 1984

[54] HYDROSTATIC DRIVE SYSTEM FOR AN EXCAVATOR

[75] Inventor: Franz Forster, Muhlbach, Fed. Rep. of Germany

[73] Assignee: Linde Aktiengesellschaft, Hollriegelskreuth, Fed. Rep. of Germany

[21] Appl. No.: 213,750

[22] Filed: Dec. 8, 1980

[30] Foreign Application Priority Data

Dec. 24, 1979 [DE] Fed. Rep. of Germany ....... 2952303

[51] Int. Cl.³ .................... B62D 11/04; B62D 27/00
[52] U.S. Cl. .................................. 60/484; 60/916; 417/442; 180/6.58; 180/329; 180/308
[58] Field of Search ............... 60/484, DIG. 10, 493, 60/486; 180/6.58, 6.6, 336, 6.3, 6.48, 308, 329, 326, 331; 417/271, 442

[56] References Cited

U.S. PATENT DOCUMENTS

| | | | |
|---|---|---|---|
| 2,612,873 | 10/1952 | Walter | 60/493 X |
| 3,489,235 | 11/1970 | Watson | 180/6.58 X |
| 3,817,341 | 6/1974 | Greene | 180/308 X |
| 3,891,003 | 6/1975 | Duttarer | 180/327 |
| 3,920,092 | 11/1975 | Henderson et al. | 180/6.48 |
| 3,928,969 | 12/1975 | Picker | 60/DIG. 10 |
| 4,177,869 | 12/1979 | Crabiel | 180/6.58 |
| 4,195,480 | 4/1980 | Shelby et al. | 60/486 |

Primary Examiner—Arnold Rosenthal
Attorney, Agent, or Firm—Buell, Blenko, Ziesenheim & Beck

[57] ABSTRACT

A hydrostatic drive system for an excavator is provided having a primary energy source on the excavator, at least one pump installed in a housing for supplying several consumers, a connection between each pump and consumer effected through at least one control block and at least one connection from a consumer through a rotary transmission to the pump and wherein at least some of the pumps, distributors, control blocks and rotary transmission are joined into a common block.

5 Claims, 2 Drawing Figures

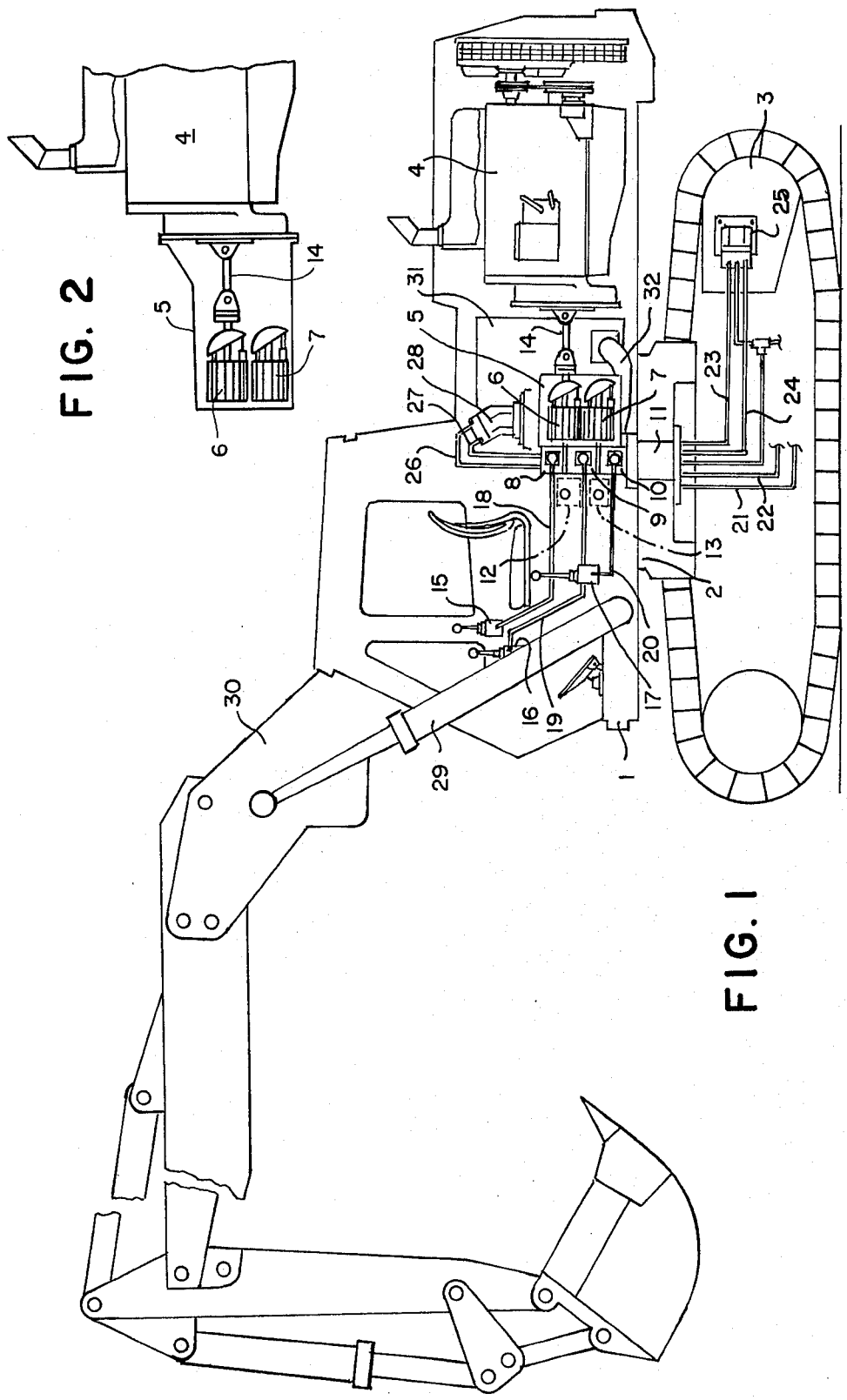

HYDROSTATIC DRIVE SYSTEM FOR AN EXCAVATOR

This invention relates to a hydrostatic drive system for an excavator and particularly to a hydrostatic drive system for backhoes and similar excavators.

The invention here is particularly directed to a hydrostatic drive system for an excavator with a primary energy source, which is preferably a reciprocating engine, and with at least one pump located in a housing for the selective supplying of several consumers, such as hydraulic cylinders or motors, in which case the connection between the or each pump and the consumers supplied is effected over at least one control block and possibly distributors or distributor blocks and where preferably at least one of the consumers can be connected to the pump through a rotary transmission and where additional auxiliary pumps are preferably provided. In the drive systems of this type that have been known to date the pump was either flanged onto the internal-combustion engine or fastened in the frame of the upper carrying chassis of the excavator, the distributors and control blocks attached at another site, also on the upper carrying chassis, and the rotary transmission was also arranged separately, in which case the pumps with the control and distributor blocks and these in turn were connected with the rotary transmission through hoses and pipelines. This so-called in-open-order construction with connection through hoses and/or pipelines is very expensive, not only due to the cost of material for the pipelines and hoses, but also primarily for the connecting elements to which the pipelines and hoses are joined together with each other and with the connected element and due to the effecting of these connections.

The purpose of the invention is to reduce the production costs and at the same time increase the operting reliability of such hydrostatic drive systems.

This problem is resolved according to the invention in that at least some of the following elements or components: pump or pumps, distributor(s) (distributor block), control block, and rotary transmission, are joined together to form a common block or unit. Pipelines and hose connections are no longer needed between the components or elements joined together to form a common unit and thus the bolts and flange connections and the gasket sites for them also fall away, such that the material and production costs are substantially reduced, and are replaced by directly connected channels in the individuals elements. These channels furnish short paths of constraint for the working fluid (normally oil) and there is thus a reduction in the flow losses in the flowing fluid. The material and production costs are substantially reduced as compared with the systems having separately located functional groups as known to date. The essential feature of the new approach is thus the combination of at least some of the essential hydraulic components, which were previously located separately, into one hydraulic unit that includes the pumps, both the pumps for the main flows and also the auxiliary pumps for the secondary flows, the distributor and control block unit, and expediently also the rotary transmission. For certain applications (e.g., when the internal-combustion engine lies crosswise) a partial combination can be provided as an intermediate stage, for example, such that the main and auxiliary pumps with distributor and control block are combined and flanged onto the internal-combustion engine, while the rotary transmission is situated separately as before, or such that the control and distributor block with rotary transmission are combined into one unit, in which case the pump is separate.

In a hydrostatic drive system for an excavator with at least one pump installed in a housing and with switching valves by which the pump or each pump can be connected at will with several consumers, it is also provided according to the invention that at least the switching valves are located directly at or in the housing of the pump, in which case in an additional variant with a drive system of this type having several pumps the pumps are located in a common housing, on or in which the switching valves are also located. In a drive system for an excavator, in which at least one of the consumers can be connected with the pump through a rotary transmission, it can also be provided that the rotary transmission with the switching valves and the pump housing together form the so-called common unit or block. Because the connecting points for pipelines and hoses can themselves give rise to leaks, the operating reliability is also increased by the integration of several functions in one structural component according to the invention.

Additional expedient designs are specified in the subclaims.

In the accompanying drawings I have illustrated in:
FIG. 1, a semi-schematical cross section of a caterpillar type backhoe embodying the invention; and
FIG. 2, a fragmentary section showing the pump assembly flanged to the prime mover.

A caterpillar-type backhoe is shown semi-schematically in cross section in the drawing as an example of implementation of the invention.

The upper carrying chassis 1 of the backhoe is supported by means of a pivot bearing 2 on the undercarriage 3. The internal-combustion engine 4 is supported in the frame of the upper chassis 1 and a hydraulic unit 5, comprised of two individual inclined-disk (swash plate) pumps 6 and 7 and three control blocks 8, 9, and 10, as well as the rotary transmission 11, is also supported separately from it. Two additional auxiliary pumps 12 and 13 are designated in the drawing by dot-dash lines. The dot-dash method of dipiction is in order to emphasize that these pumps are not absolutely necessary, but that if such auxiliary pumps are necessary in order to generate auxiliary or secondary flows, they can also be flanged directed onto the hydraulic block 5.

The drive shaft of the hydraulic block 5, by which the two inclined-disk pumps 6 and 7 are driven, is connected to the power output shaft of the engine 4 through a Cardan shaft 14.

The controls 15, 16, and 17 are provided in the cab of the backhoe. Control 15 is connected through a control-pressure line 18 with the control block 8. Control 16 is connected with the control block 9 through a control-pressure line 19. Control 17 is connected with the control apparatus 10 through a control-pressure line 20.

Four pipelines 21, 22, 23, and 24 go downward from the rotary transmission 11, in which case the pipelines 23 and 24 lead to right-hand propelling motor 25, while the pipelines 21 and 22 lead to the left-hand propelling motor (not shown in the drawing).

Another two pipelines, which lead to the slewing motor 28, which in turn is supported in the frame of the upper chassis, lead out from the hydraulic block 5.

Additional pipelines (not shown in the drawing) lead out from the control blocks 8, 9, and 10 and pass to the individual hydraulic cylinders, as, for example, the cylinder 29 on the boom 30 of the backhoe.

A reservoir 31 for hydraulic fluid is also supported in the upper chassis 1. From it a suction pipeline 32 leads to the space in the hydraulic block 5 in which the two pumps 6 and 7 are located and from which the auxiliary pumps 12 and 13 may effect their suction.

The concept of combining two pumps into a dual-pump aggregate with a common housing is familiar in itself (German design patents Nos. 70 21 825 and 19 08 472).

By driving pumps 6 and 7 and possibly 12 and 13 by means of the Cardan shaft 14, the vibrations of the internal-combustion engine 4 are kept away from the pumps and the problem associated with such vibration are eliminated.

In the foregoing specification I have set out certain preferred practices and embodiments of my invention, however, it will be understood that this invention may be otherwise embodied within the scope of the following claims.

I claim:

1. A hydrostatic drive system for an excavator having a primary energy source, comprising a common drive block, at least one pump in said drive block drivingly connected to said energy source, at least one control block on said drive block receiving fluid from said pump, rotary fluid coupling means connected to said dirve block receiving fluid from said at least one pump, at least one drive motor drivingly connected to said fluid coupling means, at least one hydraulic actuator drivingly connected to said at least one control block, connections within said drive block operatively connecting said at least one pump, said at least one control block and said fluid coupling and reservoir means connected to said drive block, providing fluid to said at least one pump.

2. A hydrostatic drive system as claimed in claim 1 having a control block for each actuator fixed on said common drive block receiving fluid from said at least one pump.

3. A hydrostatic drive system as claimed in claim 1 wherein two pumps operatively connected together and drivingly connected to said energy source are provided.

4. A hydrostatic drive system as claimed in claim 1, 2 or 3 wherein the at least one pump is connected to the energy source through a Cardan drive shaft.

5. A hydrostatic drive system as claimed in claim 1, 2 or 3 wherein auxiliary pumps fixed to said drive block are driven by said energy source and obtain fluid from said drive block.

* * * * *